United States Patent [19]

Klapper et al.

[11] Patent Number: 5,729,016
[45] Date of Patent: Mar. 17, 1998

[54] LOW COST NIGHT VISION SYSTEM FOR NONMILITARY SURFACE VEHICLES

[75] Inventors: Stuart H. Klapper, Rancho Palos Verdes; Howard Laitin, Torrance; Alex L. Kormos, Los Angeles; Lacy G. Cook, El Segundo; David M. Masarik, Laguna Beach; Paul R. Salvio, Palos Verdes Estates, all of Calif.

[73] Assignee: Hughes Aircraft Company, Los Angeles, Calif.

[21] Appl. No.: 702,999

[22] Filed: Aug. 26, 1996

Related U.S. Application Data

[63] Continuation of Ser. No. 304,981, Sep. 13, 1994, abandoned, which is a continuation-in-part of Ser. No. 226,728, Apr. 12, 1994, abandoned.

[51] Int. Cl.$^6$ .................................................. H04N 3/02
[52] U.S. Cl. ...................... 250/334; 250/332; 348/148
[58] Field of Search .................................. 250/330, 332, 250/334, 353; 348/148, 164; 359/859, 861

[56] References Cited

U.S. PATENT DOCUMENTS

| | | | |
|---|---|---|---|
| 3,689,695 | 9/1972 | Rosenfield et al. | 348/148 |
| 4,733,955 | 3/1988 | Cook | 359/859 |
| 4,815,757 | 3/1989 | Hamilton | 348/148 |
| 4,949,108 | 8/1990 | Verret | 348/373 |
| 4,973,139 | 11/1990 | Weinbrauch et al. | |
| 5,001,558 | 3/1991 | Burley et al. | 348/558 |
| 5,021,663 | 6/1991 | Hornbeck | 250/349 |
| 5,136,164 | 8/1992 | Hendrick, Jr. | 250/353 |
| 5,221,990 | 6/1993 | Cook | 359/861 |
| 5,313,063 | 5/1994 | Netzer | 250/334 |
| 5,331,470 | 7/1994 | Cook | 359/859 |
| 5,401,968 | 3/1995 | Cox | 250/353 |
| 5,414,439 | 5/1995 | Groves et al. | 345/7 |
| 5,598,207 | 1/1997 | Kormos et al. | 348/148 |

FOREIGN PATENT DOCUMENTS

| | | |
|---|---|---|
| 477986 | 4/1992 | European Pat. Off. |
| 2705293 | 11/1994 | France |
| 3900667 | 7/1990 | Germany |
| 4032927 | 4/1992 | Germany |
| 2104024 | 3/1983 | United Kingdom |

*Primary Examiner*—Carolyn E. Fields
*Attorney, Agent, or Firm*—Gordon R. Lindeen, III; Michael W. Sales; Wanda K. Denson-Low

[57] ABSTRACT

A low cost night vision system for use in connection with law enforcement vehicles, marine vessels, and other non-military surface vehicles. The invention includes a night vision camera having an array of uncooled detectors. A mechanism is provided for adjusting the pointing angle of the night vision camera in response to scan control signals. Output signals from the uncooled detectors are further processed into a standard video format and displayed on a conventional display located, for example, within a vehicle or marine vessel.

27 Claims, 13 Drawing Sheets

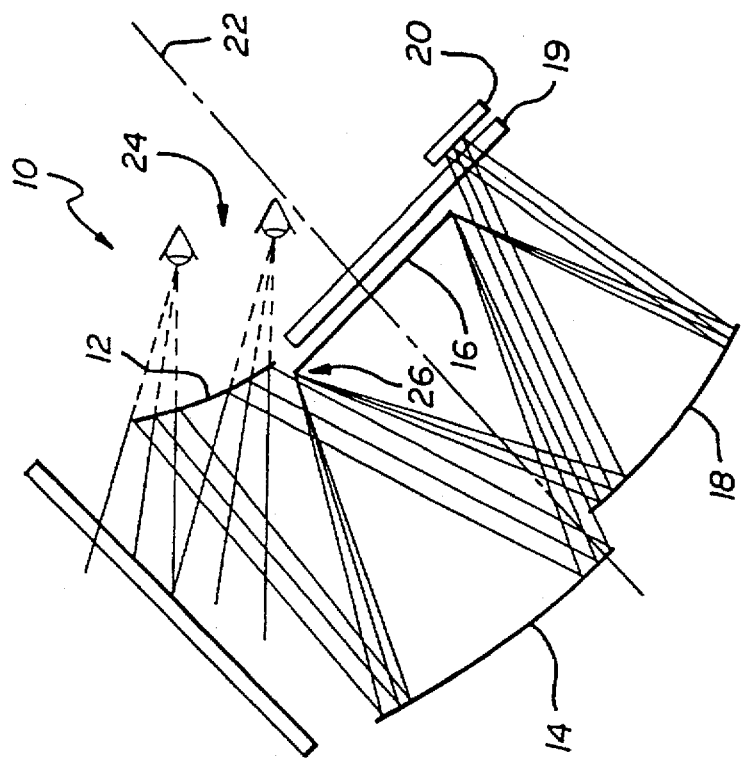
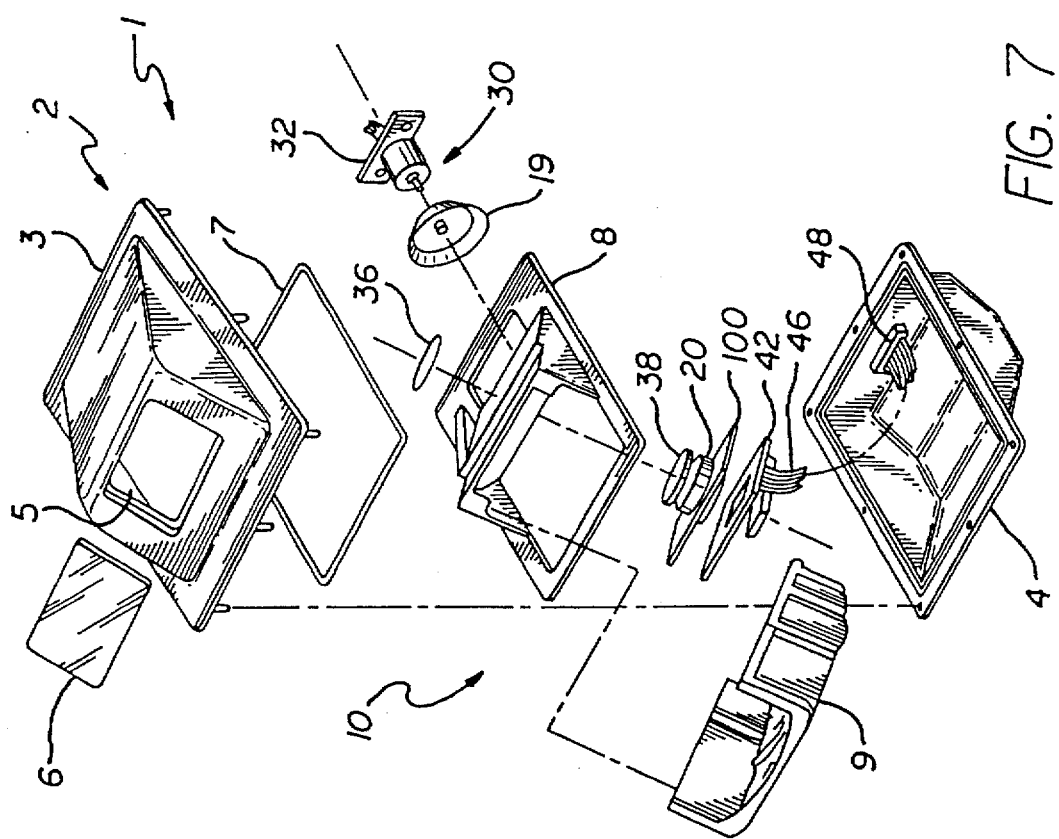
FIG. 8
FIG. 7

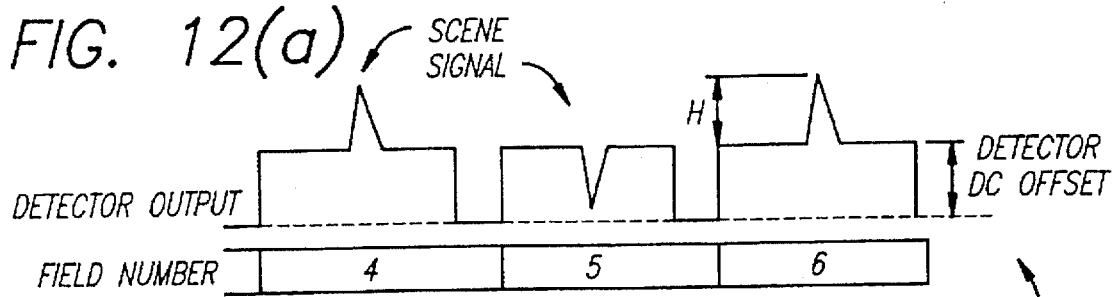
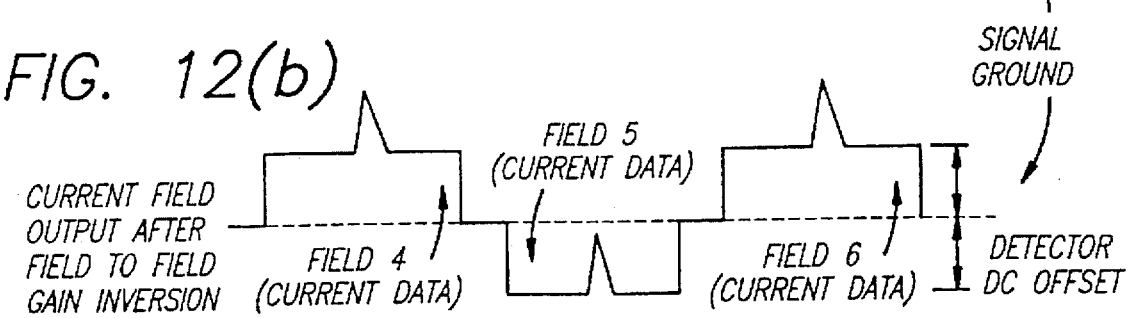
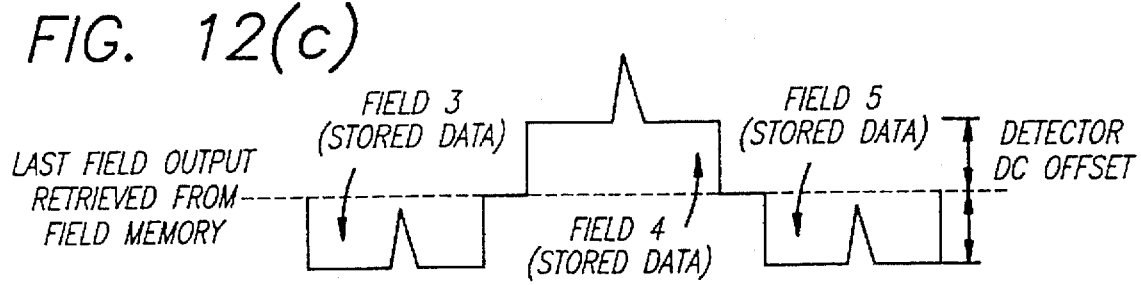
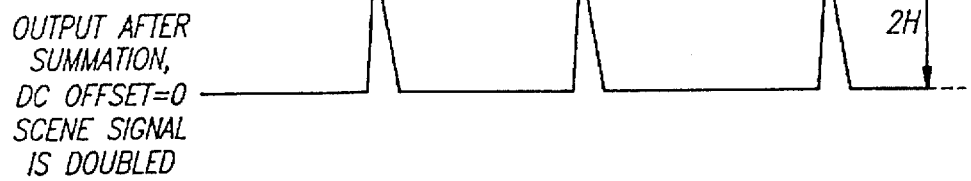

LOW COST NIGHT VISION SYSTEM FOR NONMILITARY SURFACE VEHICLES

This is a continuation application Ser. No. 08/304,981, filed Sep. 13, 1994, now abandoned, which is a continuation-in-part of application Ser. No. 08/226,728, filed on Apr. 12, 1994, now abandoned.

BACKGROUND OF THE INVENTION

1. Field of the Invention

The present invention relates to imaging systems. More specifically, the present invention relates to night vision systems.

2. Description of Related Art

In many cities, the crime rate is increasing relative to the availability of resources to deal with the problem. In these cities, maximum utilization of existing resources with minimal additional investment has become imperative. In this regard, it is now well accepted that assets which are available at low cost and which, nonetheless, afford substantial improvements in the capabilities, performance and safety of law enforcement and emergency personnel are most likely to contribute to an optimally cost effective solution.

The effectiveness of law enforcement and emergency personnel, and public safety in general, is limited by the ability of these public servants to observe a perpetrator, a person in danger or a dangerous condition. During the daylight hours, visibility is limited by weather conditions (e.g. rain, snow, fog, etc.), smoke, haze, or other natural or artificial condition. At night, these visibility limiting conditions are further exacerbated by darkness. Darkness presents a particular problem for law enforcement agencies in that it provides cover for criminal activity and complicates searches for missing persons and evidence.

Darkness also presents a number of risks to marine vessels, including commercial vessels, law enforcement vessels, and pleasure boats. Darkness, of course, impairs visibility, and thus the ability to discern various dangers. In particular, darkness impairs the mariner's ability to avoid unlit boats and other debris in water, to identify land, shallow water, reefs, buoys, markers, and other boats, to discern background lights over boating lights, and to navigate in unfamiliar or narrow waters. At times radar may detect a blip at night, but it is not possible to tell what object the blip represents.

In marine law enforcement applications, a need for improved night vision exists in order to more effectively identify other boats with regard to number of engines, boat design, unique markings, and other information used to describe the boat. Improved night vision would further aid in searching for criminals along the water's edge, intercepting boats at night, spotting nighttime air drops of drugs, locating swimmers or a man overboard, and spotting missing hunters or children who tend to walk along the water's edge to find their way back. Other areas where improved night vision would be of assistance are in finding hot spots or fire origins on a wharf fire and locating debris or clues of a recently sunken ship.

Night vision systems are known in the art. Image intensifiers and light enhancing systems have been used in handheld and goggle configurations, much like binoculars. However, these devices provide images that degrade in varying lighting conditions, and they can be ineffective in locating warm objects such a man overboard or objects that exhibit a thermal temperature difference.

Infrared cameras and other devices have been used for years for military and aerospace applications ranging from spacecraft to infantry. However, despite an acute need for improved night vision capability in various applications as discussed above and despite the availability of night vision systems, very few public safety personnel have heretofore been provided with equipment which would allow for vision in the conditions of darkness, smoke, haze, bad weather, etc. The primary reason has been cost. With aerospace and military systems costing at least $50,000 per unit, it is not surprising that few municipalities have seriously considered the acquisition of such systems.

Thus, there is a need in the art for a low cost system for providing visibility in conditions of darkness, smoke, haze and bad weather.

SUMMARY OF THE INVENTION

The need in the art is addressed by the present invention which provides a low cost night vision system for use with a variety of nonmilitary surface vehicles, including, but not limited to, land vehicles and marine vessels in various mobile law enforcement, marine, and emergency applications. The invention includes an infrared camera mounted on the surface vehicle.

BRIEF DESCRIPTION OF THE DRAWINGS

FIG. 7 is a perspective view of an illustrative embodiment of the camera of the night vision system of the present invention in disassembled relation.

FIG. 8 is a side view illustrative of the reflective optical arrangement of the camera of the night vision system of the present invention.

FIG. 12(a) is a waveform illustrating the output of a typical pyroelectric detector.

FIG. 12(b) is a waveform illustrating the waveform of FIG. 12(a) after field-to-field gain inversion in accordance with the present teachings.

FIG. 12(c) illustrates a previous field of output from a pyroelectric detector.

FIG. 12(d) is a waveform illustrating the output after a summation of the waveforms shown in FIGS. 12(b) and 12(c).

DETAILED DESCRIPTION OF THE PREFERRED EMBODIMENTS

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
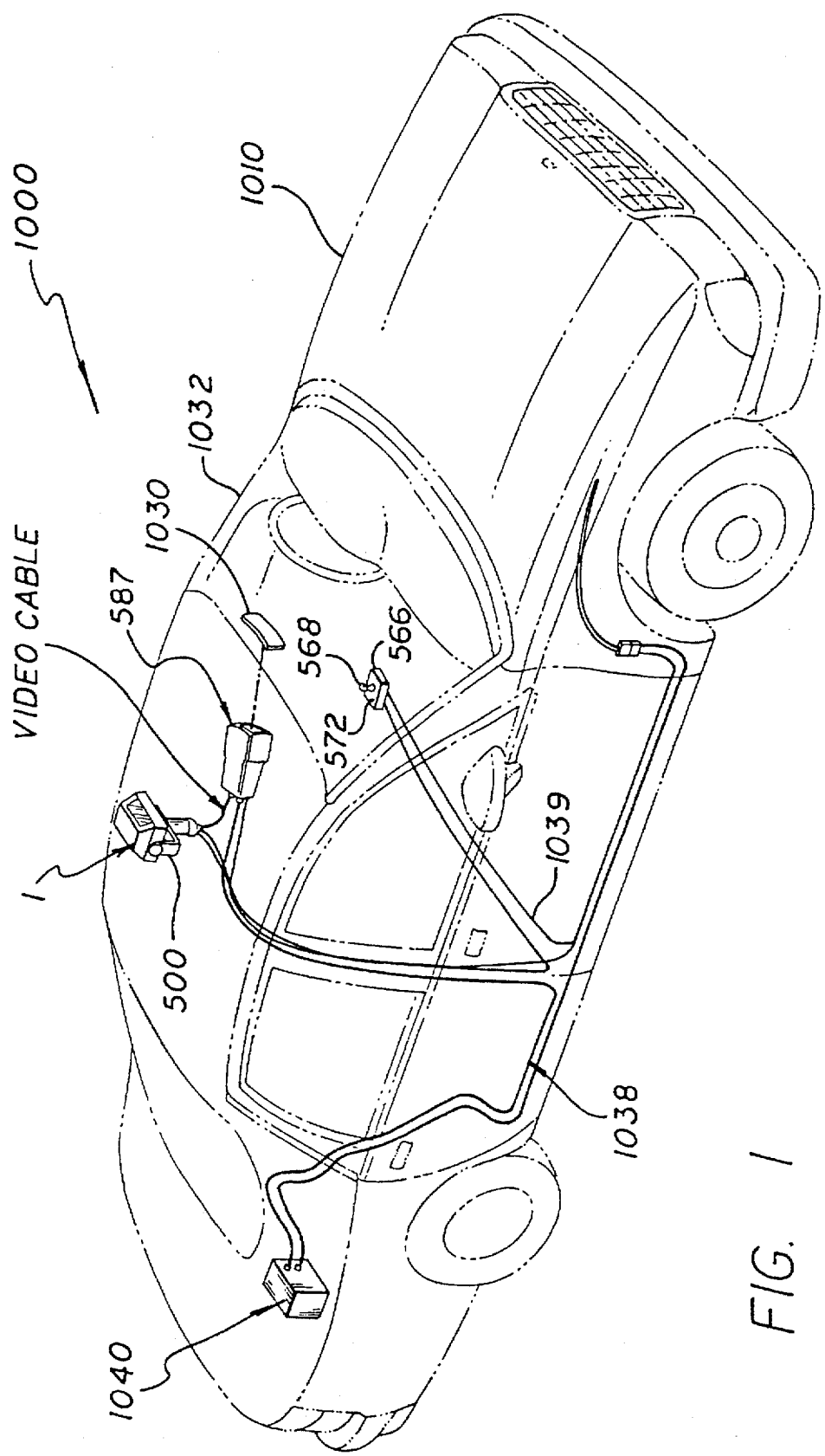
FIG. 1 is a schematic diagram of the low cost night vision system of the present invention in an illustrative installation in a vehicle, particularly in a public safety vehicle (shown in phantom).

FIG. 1 is a schematic diagram of the low cost night vision system of the present invention in an illustrative installation in a public safety vehicle (shown in phantom). The system 1000 includes a night vision camera 1 mounted in a pointing mechanism 500 on top of a public safety vehicle 1010 (shown in phantom). The night vision camera 1 and the pointing mechanism 500 are secured to the top of the vehicle 1010 by mounting hardware 1012 (not shown in FIG. 1).

Figure 2:
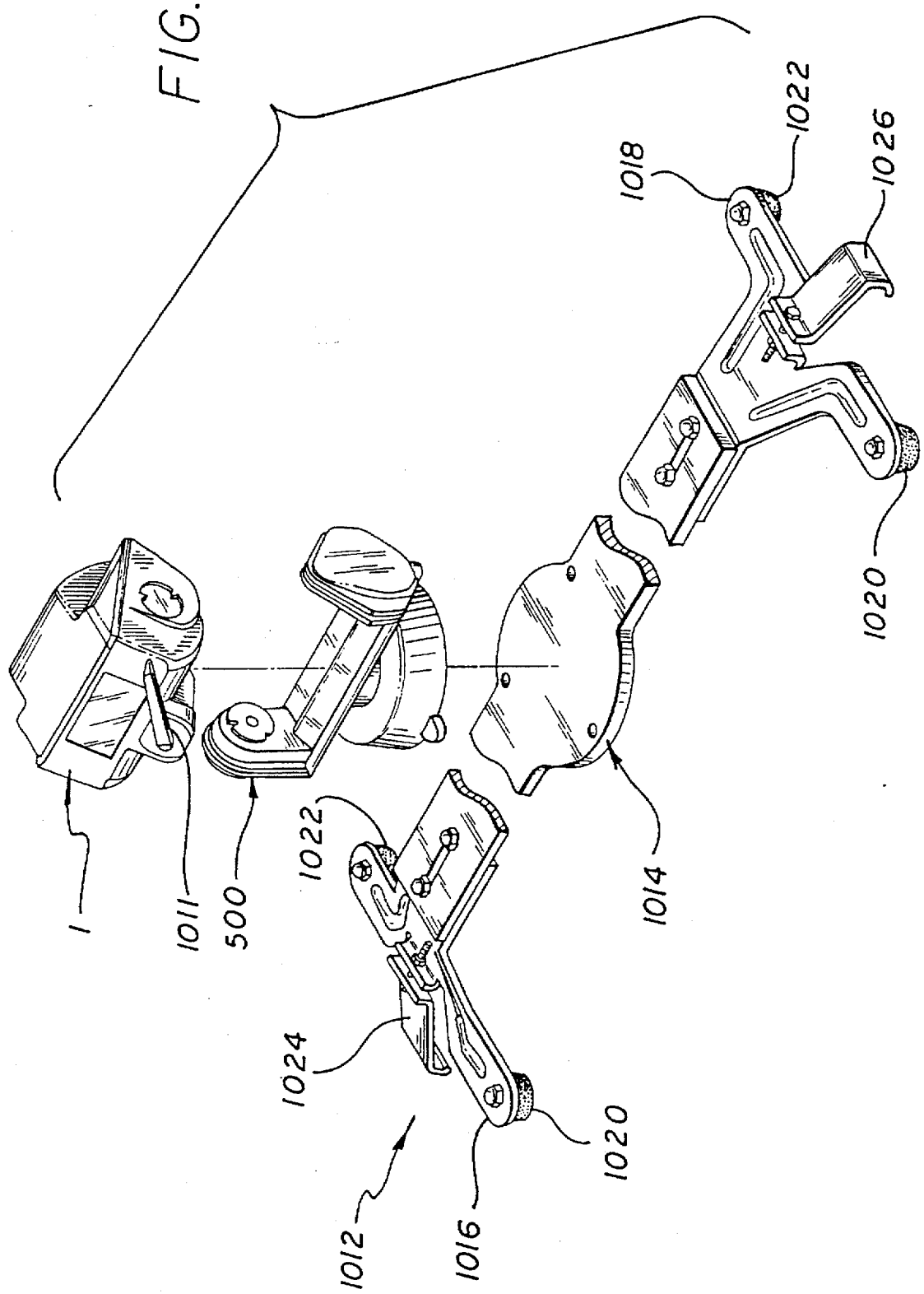
FIG. 2 is a perspective view of the camera, camera pointing mechanism and the mounting hardware of the present invention in disassembled relation.

FIG. 2 is a perspective view of the camera 1, camera pointing mechanism 500 and the mounting hardware 1012 of the present invention in disassembled relation. As illustrated in FIG. 2, the night vision camera 1 and the pointing mechanism 500 are bolted to an elongate center support 1014 of the mounting hardware. The night vision camera 1 is shown with an optional wiper 1011. The center support 1014 maintains the night vision camera 1 on the pointing mechanism at a height sufficient to allow the camera to see over the light bar (not shown) of the vehicle, yet low enough so as not to present a height, obstruction when the vehicle is driven underneath low overhangs, parking structures, bridges, etc. In addition, as discussed more fully below, the mounting height of the camera 1 is minimized by the novel low profile design thereof along with the unique pointing mechanism which mounts the camera 1 for rotation about a tilt axis through the center of gravity thereof.

The center support 1014 is adjustably connected to first and second Y-shaped footings 1016 and 1018. Each footing 1016, 1018 has first and second rubber or plastic tips 1020 and 1022 which rest on the top of the vehicle 1010. The mounting hardware 1012 is secured to the roof of the vehicle 1010 by first and second clamps 1024 and 1026 which bolt to the first and second footings 1016 and 1018, respectively.

Returning to FIG. 1, the night vision camera 1 is connected to a display unit which, in the illustrative embodiment, may be implemented as a "Datavision" head-up display (HUD) available from Hughes Aircraft Company. The Datavision HUD includes a projector 587, a combiner 1030, display electronics located in the trunk, and cables 1038, 1039. The combiner 1030 is mounted on the windshield 1032 (shown in phantom) of the vehicle 1010 for displaying a real image from the projector 587. The cables are stowed in mounting brackets and the cables are shielded.

The video display is not limited to a Datavision HUD. Alternatively, an active matrix liquid crystal display (LCD) mounted on the dashboard of the vehicle can be used to display the real image from the camera. Active matrix LCDs are available from such companies as Citizen, Sharp, and Toshiba, to name a few.

Instead of displaying a real image, the video display can display a virtual image. The virtual image can be displayed by "virtual image glasses" available from suppliers such as Virtual Vision in Redmond, Wash. The virtual image glasses project a TV-like, wide screen image in front of the bumper of the vehicle. An officer wears the glasses to view the scene ahead. Data is transmitted either through hard-wired connections or wireless (e.g., spread spectrum) transmission from the camera to the glasses. Instead of the glasses, a helmet-mounted visor can be used to project the TV-like, wide screen image in front the bumper of the vehicle. One such helmet-mounted visor is disclosed in Chen et al. U.S. Pat. No. 5,357,372, the teachings of which are incorporated herein by reference.

Alternatively, a virtual image can be displayed directly on the vehicle windshield by the virtual display disclosed and claimed in U.S. patent application Ser. No. 07/971,799, entitled VIRTUAL IMAGE INSTRUMENT PANEL DISPLAY and assigned to the assignee of the present invention. This system, which includes mirrors and an active matrix LCD as a source, can be installed at the vehicle manufacturer, or it can be installed as an aftermarket add-on.

The system 1000 is controlled by a remote control unit 566 mounted inside the vehicle 1010. In the preferred embodiment, the remote control unit 566 is implemented with a joystick 568 and a plurality of switches 572. The camera 1, remote control 566 and the projection unit are interconnected are interconnected by a data harness 1038 and a power harness 1039 to display electronics 1040 located in the trunk of the vehicle 1010.

Figure 3:
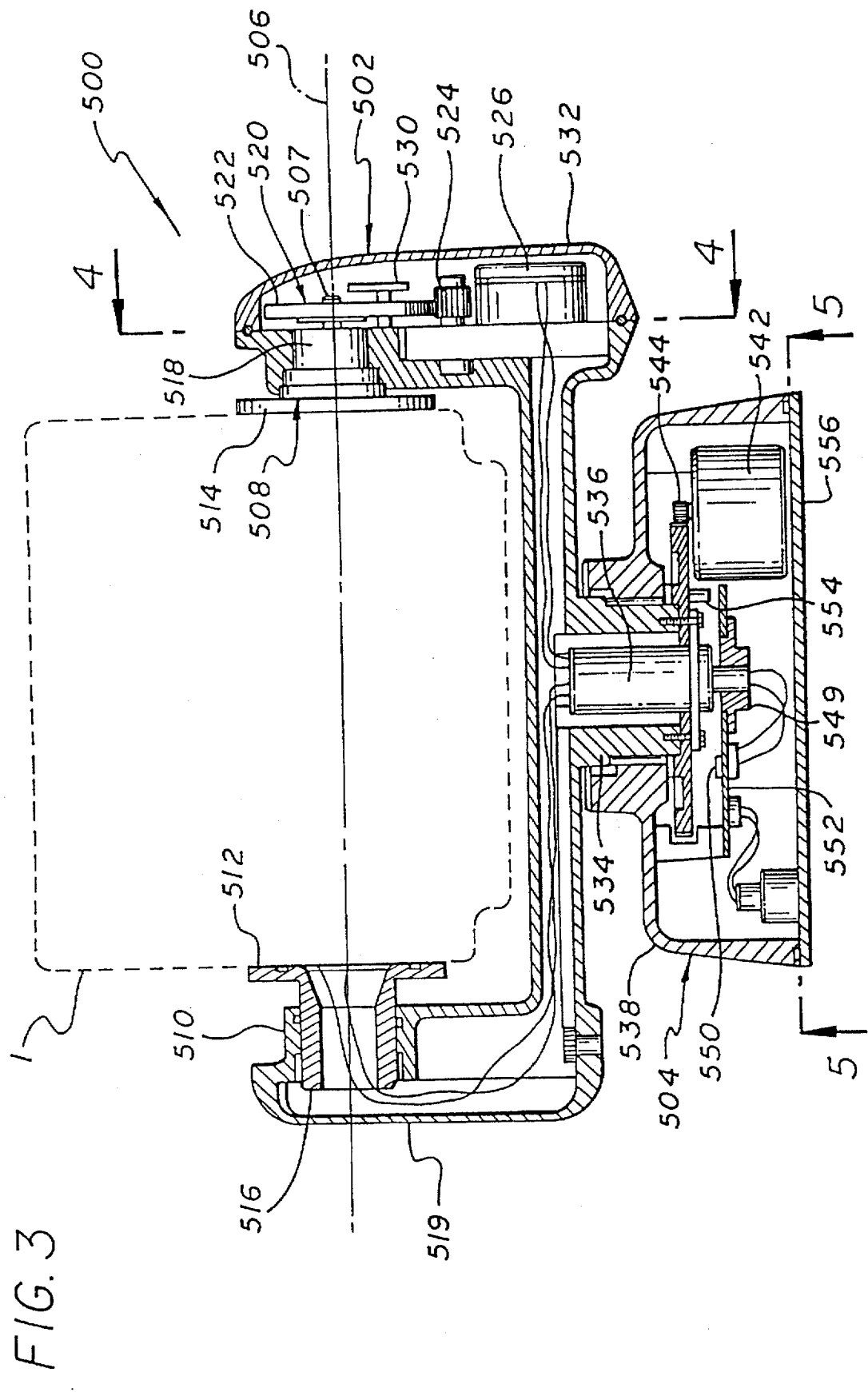
FIG. 3 is a front sectional view of the pointing mechanism of the low cost night vision system of the present invention.
Figure 4:
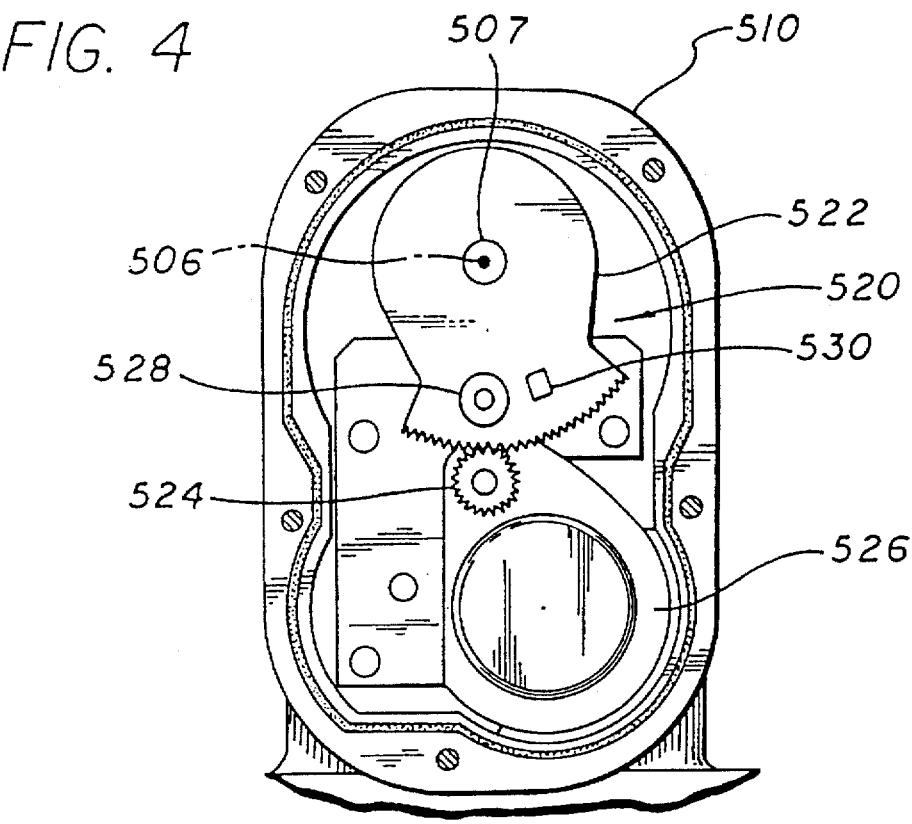
FIG. 4 is a side view of the pointing mechanism of the low cost night vision system of the present invention with the cover removed to provide a front view of the tilt drive assembly.
Figure 5:
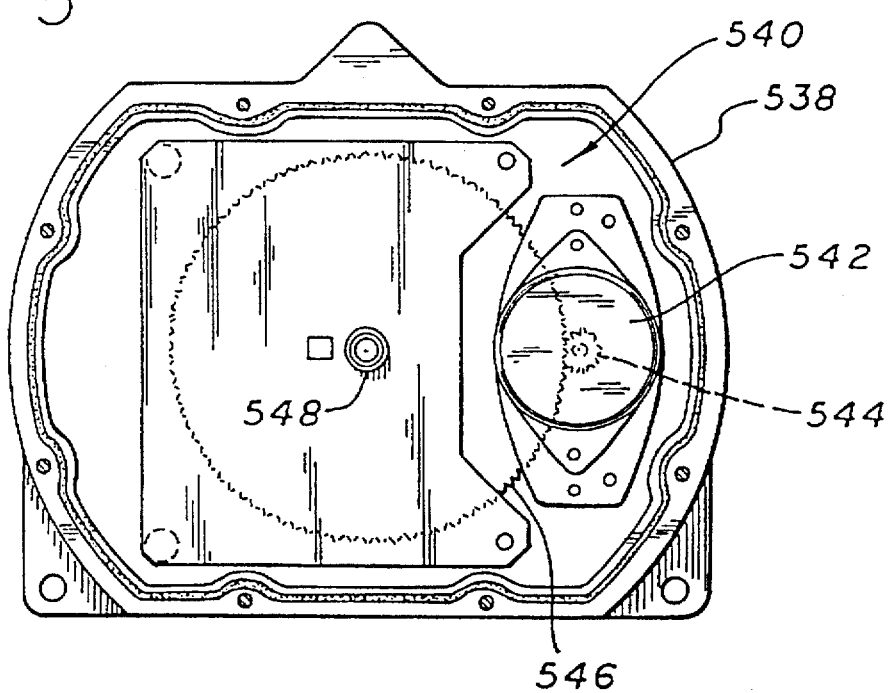
FIG. 5 is a bottom view of the pointing mechanism of the low cost night vision enhancement system of the present invention with the bottom cover removed to show the pan drive mechanism.

The pointing mechanism 500 is illustrated in FIGS. 3–5. FIG. 3 is a front sectional view of the pointing mechanism 500. As disclosed and claimed in U.S. patent application Ser. No. 08/226,791, entitled "Pan and Tilt Mechanisms" filed Apr. 12, 1994 by Kormos et al, the teachings of which are incorporated herein by reference, the pointing mechanism 500 includes an optional tilt gimbal 502 and an optional pan gimbal 504. The tilt gimbal 502 provides an axis of rotation 506 in elevation which extends through the center of gravity of the night vision camera 1. This allows for a low profile for the night vision camera 1 on the pointing mechanism. The night vision camera 1 is mounted on a floating tilt 508 which is supporting within a tilt gimbal housing 510. The floating tilt 508 has first and second trunnions 512 and 514 secured to opposite sides of the night vision camera 1 about the center of gravity thereof. The first and second trunnions 512 and 514 are coupled to first and second tilt bearings 516 and 518, respectively. The first trunnion 512 and the first tilt bearing 516 are hollow to allow a feed of wires to and from the night vision camera 1 therethrough. A first cover 519 covers the open end of the tilt gimbal 502.

A motor drive assembly 520 is disposed at the second end of the tilt gimbal 502.

FIG. 4 is a side view of the pointing mechanism 500 of the present invention with the cover removed to provide a front view of the tilt drive assembly 520. As shown in FIG. 4, the tilt drive assembly 520 includes a tilt drive gear 522 mounted for pivotal movement about the tilt axis 506 on a tilt shaft 507 which rotates therewith. The tilt drive gear 522 is driven by the tilt motor gear 524 of the tilt motor 526. In accordance with the present teachings, the tilt motor 526 is implemented with a stepper motor to eliminate the need for a complicated and costly gearing arrangement. The position of a magnet 528, mounted on the tilt gear 522, is detected by a Hall effect sensor 530. The Hall effect sensor provides an indication of the position of the tilt drive gear 522 and, therefore, the tilt angle of the night vision camera 1. Hall effect sensors are well known in the art. Other devices may be used to detect the tilt position of the night vision without departing from the scope of the present teachings. A tilt control printed wiring board (PWB) module 531 encases tilt control electronics discussed below behind the tilt drive gear 522. The tilt drive assembly 520 is enclosed by a second cover 532.

The tilt gimbal housing 510 is mounted on a pan bearing 534 so that the tilt gimbal and the night vision camera 1 can rotate in azimuth. A conventional slip ring and brush assembly 536 allows for the application of power to the night vision camera 1 and to the tilt motor 526 and for the communication of video signals from the night vision camera 1. The slip ring assembly 536 allows for 360-degree rotation and may be purchased from the Airflight Company in Bayonne, New Jersey by way of example. The pan bearing 534 seats within the pan housing 538. A pan drive assembly 540 is also provided within the pan housing 538.

FIG. 5 is a bottom view of the pointing mechanism of the present invention with the bottom cover removed to show the pan drive mechanism. As depicted in FIG. 5, the pan drive assembly 540 includes a pan drive motor 542 which, in the preferred embodiment, is implemented with an oversize stepper motor. A pan drive motor gear 544 drives a pan gear 546 which is rigidly attached to a hollow pan shaft 534 which is an integral part of tilt gimbal housing. The pan drive motor 542 may be purchased from Haydon Switch and Instrument Inc., in Waterbury, Connecticut. The use of a stepper motor provides torque without a complex gear box. The shaft 548 is the fixed end of the slip ring and brush assembly 536. As illustrated in FIG. 3, a Hall effect sensor 550 mounted on a pan control printed wiring board module 552 provides for position detection of a magnet 554 located on the pan gear 546. The fixed end 548 of the slip ring and brush assembly 536 extends through a snugger 549 located on the printed wiring control module 552. The pan control printed wiring control module 552 contains the pan control electronic circuit. The pan housing 538 has a bottom cover 556.

The embodied design is modular in that the camera 1 may be mounted in a stationary position (typical forward, viewing the road ahead). An optional tilt gimbal 502 and an optional pan gimbal 504 may be added independently to provide pointing flexibility. Dummy mounting hardware may replace the mechanized tilt gimbal 502 and pan gimbal 504 when the desire to tilt and pan is not required.

Figure 6:
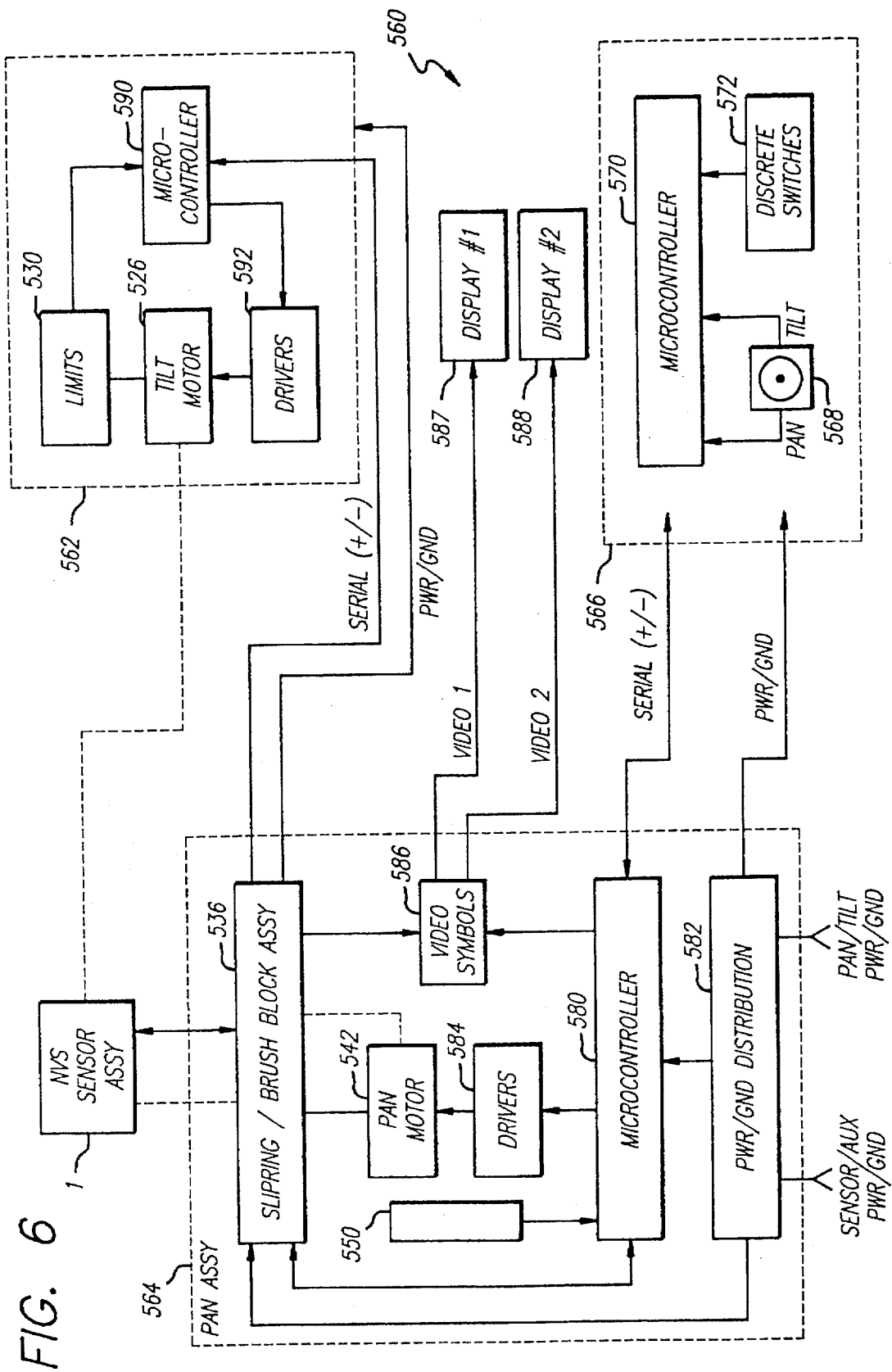
FIG. 6 is a block diagram of a preferred embodiment of the electrical system of the pointing mechanism of the present invention.

FIG. 6 is a block diagram of a preferred embodiment of the electrical system 560 of the pointing mechanism of the present invention. The electrical system 560 includes a tilt circuit 562 and a pan circuit 564. The tilt circuit 562 is mounted on the tilt PWB 520. The pan circuit 564 is mounted on the pan PWB 552.

The remote control unit 566 includes a joystick 568, a discrete switch 570 and a set of discrete switches 572. The switches 572 provide power on/off, image polarity switching, wiper control, fixed forward look ahead and scan angle setting. Image polarity switching allows for "black hot" or "white hot" operation. The wiper control effects the operation of an optional wiper (not shown) on the night vision camera 1. The "fixed forward look ahead" switch returns the night vision to a predetermined pointing angle for fast and easy location reference. The scan angle switch operates with the joystick 568 to fix the pan scan angles of the system 500. For example, when the joystick 568 is moved to the forward position while the scan angle switch is set, the remote microcontroller 570 stores the instantaneous pan scan angle as one of two scan limit angles. The other scan limit angle is set in the same manner. A single scan angle results in continuous 360-degree panning.

The scan speed can be modified by the operator once the scan mode is initiated by jogging the pan joystick axis left or right for decreased scan speed and increased scan speed, respectively. The tilt angle can also be modified with the tilt joystick during the scan mode.

In the normal mode of operation, the remote microcontroller 570, which may be implemented with a conventional microprocessor, converts analog voltages for pan and tilt from the joystick 568 to clockwise, counterclockwise, and up and down digital serial commands for pan and tilt, respectively. The commands are transmitted to the pan microcontroller 580 and used to drive the pan gimbal 504. In addition, tilt commands are passed through the pan microcontroller 580 to the tilt circuit 562 and used to drive the tilt gimbal drive trunnion 514.

The pan microcontroller 580 provides pan control commands to a driver circuit 584 which generates the appropriate number of square pulses at the appropriate rate to drive the pan motor 542. The position sense symbology is checked and reset each time the sensor passes through the fixed forward zero position by use of the Hall effect sensor 550. The Hall effect sensor 550 provides position signals to the pan microcontroller which, in turn, provides addresses based on pointing angle to a video symbols buffer (586) in which video signals from the night vision camera 1 are stored for display. The output of the video symbols buffer 586 is electronically summed onto the video signals from the camera 1 and provided to first and second displays 587 and 588.

The serial tilt commands are passed to a tilt microcontroller 590. The tilt controller 590 commands the tilt motor 526 to move in a desired direction at a desired rate via a second driver circuit 592.

In the preferred embodiment, the pan gimbal is designed to rotate a continuous 360 degrees (unlimited), the tilt unit has a maximum travel of approximately −22 degrees to +45 degrees from horizontal zero. Limit stops are provided in the form of Hall effect devices on the tilt gear assembly to protect the tilt assembly from damage due to overrotation. The tilt axis can be extended easily by modifying the tilt gimbal design, if necessary.

FIG. 7 is a perspective view of an illustrative embodiment of the night vision camera 1 in disassembled relation. As disclosed in U.S. patent application Ser. No. 08/232,893, entitled LOW COST NIGHT VISION CAMERA, filed on Apr. 12, 1994 by Klapper et al., the teachings of which are incorporated herein by reference, the night vision camera 1 includes a housing 2 having an upper portion 3 and a lower portion 4. The upper portion 3 (or lower portion) has a rectangular aperture 5 therethrough in which an infrared transmitting window 6 seats. The infrared transmitting window 6 protects the camera from contaminants. In the preferred embodiment, the infrared window 6 is constructed in accordance with the teachings of U.S. patent Ser. No. 08/232,897, entitled LOW COST INFRARED WINDOW AND METHOD OF MARKING SAME, filed Apr. 22, 1994 by Norman Harris, the teachings of which are incorporated herein by reference.

A seal 7 is interposed between the upper part of the housing 3 and the lower part of the housing 4. The sub-housing parts 8 and 9 support the compact reflective optical arrangement 10.

FIG. 8 is a side view illustrative of the compact reflective optical arrangement of the inventive camera. The compact reflective optical arrangement is disclosed and claimed in U.S. patent Ser. No. 07/989,279, entitled FAST FOLDED WIDE ANGLE LARGE REFLECTIVE UNOBSCURED SYSTEM, filed Dec. 11, 1992 by Lacy G. Cook, the teachings of which are incorporated herein by reference. As disclosed therein, the arrangement 10 includes a primary mirror 12, a secondary mirror 14, a fold mirror 16, and a tertiary mirror 18. The mirrors 12-18 (even numbers only) focus energy received through the window 6 to a focal plane array 20 of uncooled detector elements. The primary mirror 12 has an axis 22 defining the system optical axis. The primary mirror 12 is a negative power mirror having a surface which is a higher order aspheric. The primary mirror 12 is mounted in the subhousing 8.

The secondary mirror 14 is a positive power mirror and is mounted in the subhousing part 9. The secondary mirror 14 has a surface which is a higher order aspheric.

The fold mirror 16 is mounted in the subhousing part 8 and is optically interposed between the secondary mirror 14 and the tertiary mirror 18. The fold mirror 16 is a nonpowered mirror having a nonplanar, preferably higher order aspheric surface.

The tertiary mirror 18 is a positive power mirror and is mounted in the subhousing part 9. The surface of the tertiary mirror 18 is also a higher order aspheric.

The power of the two positive powered mirrors 14 and 18 is balanced by the negative power of the primary mirror 12 to provide a zero Petzval curvature or a flat field condition.

The primary and secondary mirrors 12 and 14 form a nonreimaging afocal telescope of the Galilean type at an afocal magnification of 2 x. Additionally, these two mirrors 12 and 14 relay a virtual entrance pupil 24 located behind the primary mirror 12 to a real aperture stop 26. At the aperture stop 26, the fold mirror 16 is positioned to receive the beam from the secondary mirror 14 and reflect the beam to the tertiary mirror 18. The tertiary mirror 18 focuses and directs the beam to the detector array 20 via a chopper disk 19.

The arrangement 10 is from the WALRUS family (i.e. WALRUS design), since it is a nonrelayed three-mirror form with a mirror power distribution of negative, positive, positive used on-axis in aperture and off-axis in field. By locating the fold mirror 16 between the secondary mirror 14 and the tertiary mirror 18, the optical path is folded back with the secondary mirror 14 and tertiary mirror 18 adjacent to one another. The length of the arrangement 10 is reduced and the packaging of the optics for the application is considerably improved. Also, by locating the system aperture stop 26 at the fold mirror 16, and applying a higher order aspheric surface departure to the fold mirror 16, the spherical aberration of the arrangement 10 is easily corrected, even for very fast optical speeds. The three power mirrors 12, 14 and 18 of the telescope, together with the fold mirror 16 form a compact optical system which provides a wide two-dimensional field of view and a very fast optical speed. Fields of view exceeding 20 degrees by 40 degrees can be achieved simultaneously with optical speeds as fast as F/1.0 (i.e. high speed).

The high optical speeds afforded by the present invention are made possible by the use of a large aperture in both the vertical and horizontal planes. In the illustrative embodiment, the field of view is at least 13.5 degrees vertical by 27 degrees horizontal. Since the aperture growth in the vertical plane must be accompanied by an increase in the field of view offset to avoid interference, greater aperture growth can be achieved in the horizontal plane.

The folding of the optical train between the secondary and tertiary mirrors 14 and 18 at the system aperture stop 26 provide for a compact arrangement. Also, the fold mirror 16 includes higher order aspheric coefficients which correct the spherical aberration. Further, the optical speed of the arrangement 10 is increased by the use of a large, noncircular aperture and by increasing the offset of the field of view to accommodate the larger aperture.

For higher magnification applications an alternative reflective triplet design form for arrangement 10 is preferred such as described in U.S. Pat. No. 4,240,707 entitled ALL-REFLECTIVE THREE ELEMENT OBJECTIVE, issued Dec. 23, 1980 to Wetherell et al., the teachings of which are also incorporated herein by reference. An alternative high speed refractive optical design form for arrangement 10 may also be used for further reduction in optical compactness.

The mirrors can be fabricated through an injection molding process (see U.S. Ser. No. 08/099,280 filed Jul. 29, 1993) or through a diamond turning process. The mirrors (e.g. mirrors 12, 14, 16, and 18) may be fabricated from plastic, aluminum, ceramic or any other moldable or diamond point cuttable materials. A surface membrane or coating may be added to the mirror through processes such as replication. The surface membrane or coating provides an additional surface figure and finish required to achieve desired optical performance.

In the illustrative embodiment, the focal plane array 20 is fabricated with a plurality of high-performance pyroelectric devices such as the uncooled detectors made of barium-strontium-titanate (BST) manufactured and sold by Texas Instruments. Each detector converts infrared energy into an electrical signal without the aid of an expensive cryogenic cooler as is typically required in conventional high-performance night vision imaging systems.

The characteristics of the detectors utilized in the illustrative embodiment are shown in Table I below:

TABLE I

| Parameter | Value | Comment |
| --- | --- | --- |
| Detector resolution | | |
| Horizontal pixels | 328 | |
| Vertical pixels | 164 | |
| NETD (°C.) | ≦0.1 | Average detector NET |

TABLE I-continued

| Parameter | Value | Comment |
|---|---|---|
| Modulation transfer function | | Static square wave response at Nyquist frequency converted to MTF |
| Axial | ≧0.2 | Best-phase line spread function at video output |
| Off-axis | ≧0.15 | Area excluding central 20 percent of field of view |

In the table, "NET" refers to noise equivalent temperature, and the axial and off-axis modulation transfer functions (MTF) are dimensionless measures of system fidelity reported as a function of spatial frequency that is expressed in units of lines per millimeter. As a person skilled in the art could readily appreciate, the values in Table I are merely exemplary, and detectors having performances that depart from the high-performance values above may still be used. See also U.S. Pat. No. 4,080,532 entitled FERROELECTRIC IMAGING SYSTEM, issued Mar. 21, 1978 to G. S. Hopper; U.S. Pat. No. 5,010,251 entitled RADIATION DETECTOR ARRAY USING RADIATION SENSITIVE BRIDGES, issued Apr. 23, 1991 to J. Grinberg et al.; U.S. Pat. No. 5,021,663 entitled INFRARED DETECTOR, issued Jun. 4, 1991 to L. J. Hornbeck; U.S. Pat. No. 5,034,608 entitled INFRARED SENSOR OPERABLE WITHOUT COOLING, issued Jul. 23, 1991 to L. S. Tavrow et al.; and U.S. Pat. No. 5,288,649 entitled METHOD FOR FORMING UNCOOLED INFRARED DETECTOR, issued to W. Keenan on Nov. 22, 1984; all of which are incorporated herein by reference.

The uncooled detectors of the illustrative embodiment are most sensitive to thermal contrasts modulated at a predetermined range of frequencies. This modulation of the scene, called "chopping," is accomplished by rotating an optical element in front of the detector at the field rate so that there is a detector output every field. This provides a thermal differential to each element in the array during each revolution. The chopping momentarily focuses, then removes, the thermal scene from the detector element, allowing for a comparison of the scene with the known reference of the chopper disk 19. Accordingly, in the illustrative embodiment, a mechanical chopper 30 is used to modulate the energy incident on the detector array 20.

Returning to FIG. 7, the chopper 30 includes the disk 19 and a motor 32. The chopper facilitates the sequential readout of the array 20 and aids in the establishment of a DC reference level for the array 20 which is representative of the average DC level of the scene. The chopper operates at a 30-hertz rate and forms the basis for the image itself. The disk 19 is fabricated from optical-grade silicon. See U.S. Pat. No. 4,227,210 entitled RADIATION SHUTTERS, issued Oct. 7, 1980 to R. D. Nixon, the teachings of which are incorporated herein by reference. See also GB 2,240,000 entitled THERMAL-RADIATION DETECTION SYSTEMS AND OPTICAL CHOPPERS by Turnbull.

An alternative to the pyroelectric detector would be a silicon microbolometer detector fabricated by Hughes Aircraft Company, Honeywell, Inc., or Loral. With the silicon microbolometer, chopping is not required.

As discussed more fully below, an electronic processor 100 processes the output of the array 20 for display on any standard video screen and corrects for DC offsets and sensitivity variations in the outputs of the detectors. The signal processor 100 provides power to the chopper motor 32 and is itself powered by a power supply 42. The power supply 42 is connected to external circuitry such as a display (not shown) by a cable 46 through a port 48. The cable 46 connects to the data harness 1038 and the power harness 1039.

Figure 9:
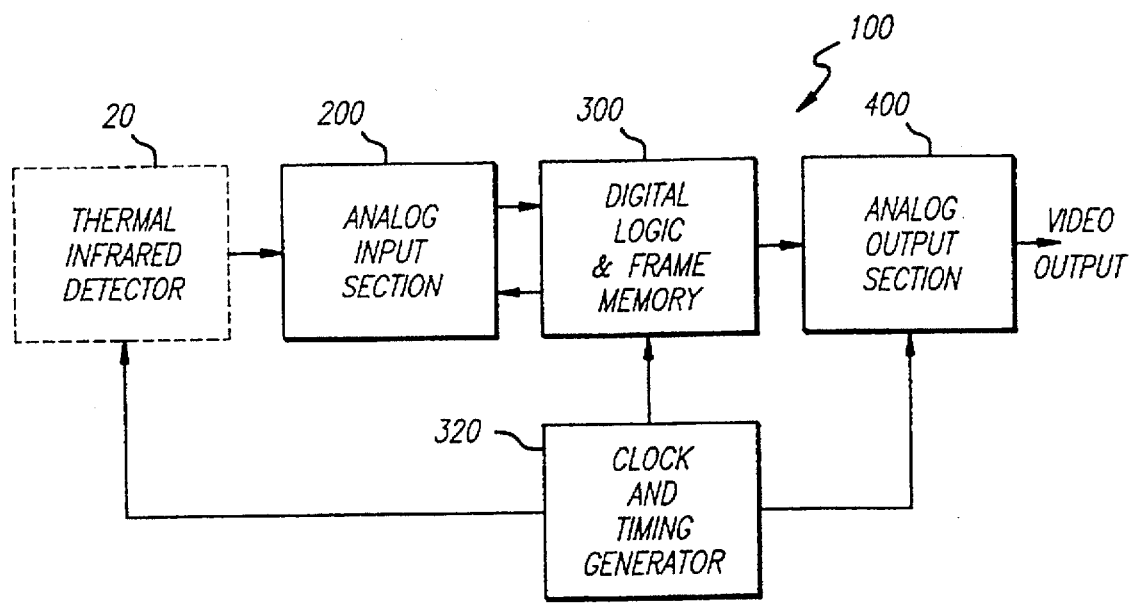
FIG. 9 is a block diagram of the signal processing system with the thermal detector shown in phantom.

FIG. 9 is a block diagram of the signal processor 100 of the present invention. The thermal infrared detector 20 is shown in phantom. Each detector has an amplifier (not shown) associated therewith which provides an output signal indicative of a change in thermal energy incident on the detector. The amplifier outputs are scanned by a semiconductor circuit bonded to the back of the array. The output from the array is provided as a serial data stream.

As mentioned above, the chopping momentarily focuses, then removes, the thermal scene from the pyroelectric detector element, allowing for a comparison of the scene with the average value of the scene. The result is a first output from the detector amplifier pair which represents the detection of energy from a focused scene and a second output which is a signal of equal and opposite polarity which represents the output of the detector amplifier resulting from the detector seeing the diffused scene. These two fields constitute a single frame.

The signal processor 100 of FIG. 9 receives these signals from the array 20 and corrects each pixel for sensitivity and offset. Then it offsets and scales the video signal to match the dynamic range of an analog-to-digital converter which converts the video signal to digital form. The signal processor 100 includes an analog input section 200, a digital logic section 300, a timing circuit 320 and an analog output section 400.

Figure 10A:
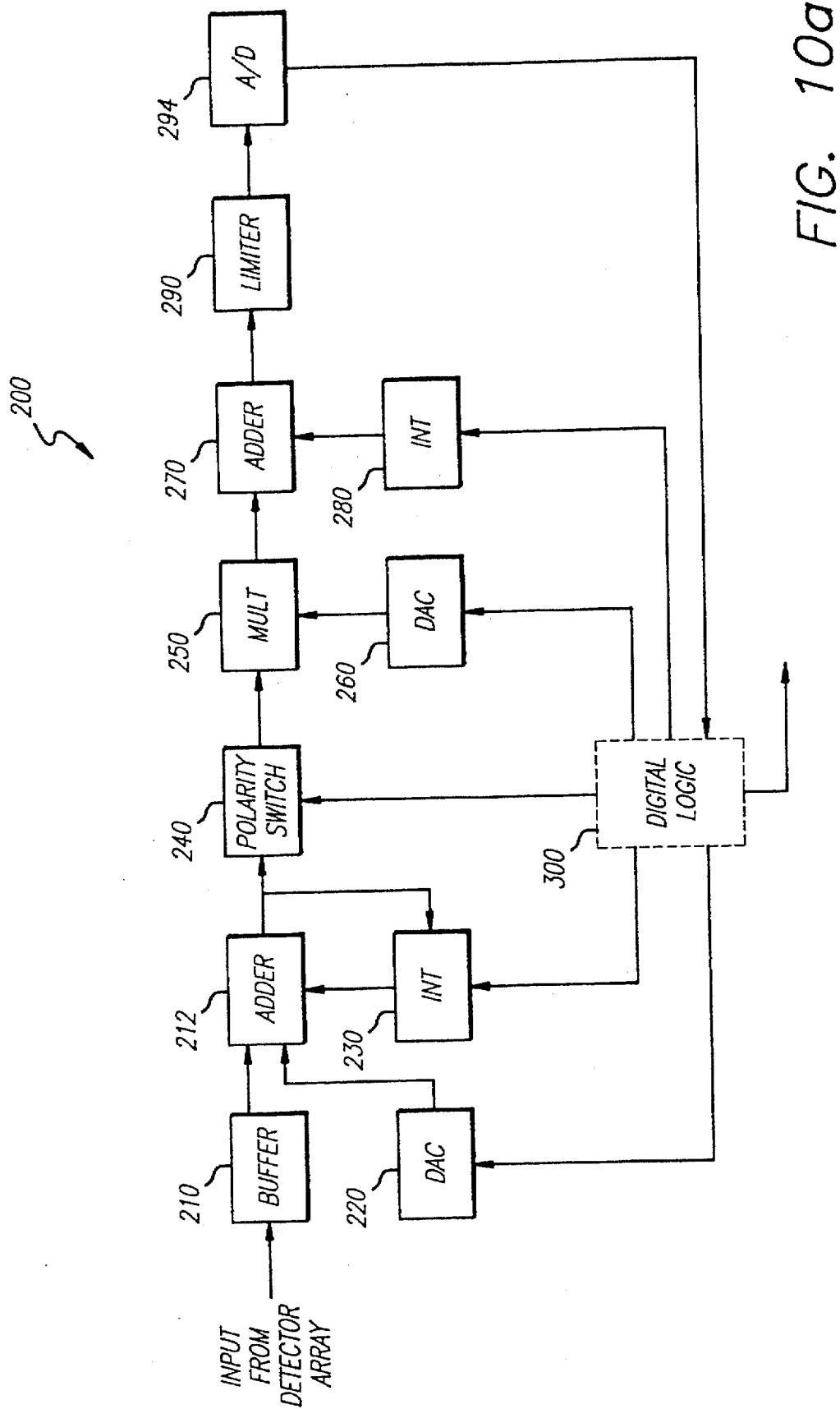
FIG. 10a is a block diagram of the analog input section of the night vision system of the present invention.
Figure 10B:
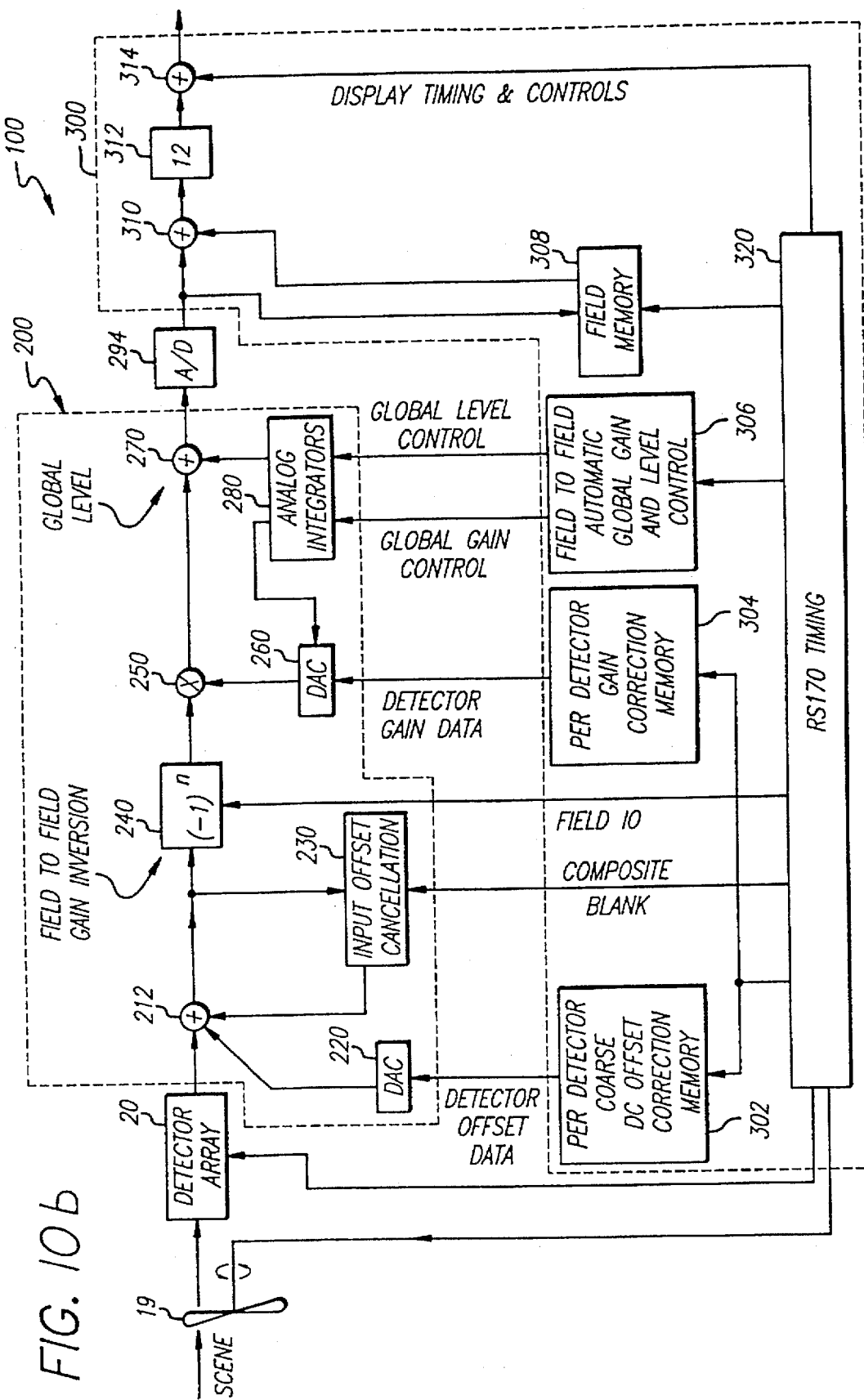
FIG. 10b is a simplified block diagram of the analog input section and the digital signal processing section of the night vision system of the present invention.

FIG. 10a is a block diagram of the analog input section 200. FIG. 10b is a simplified block diagram of the analog input section and the digital signal processing section 300. Serial video signals are received from the infrared detector array 20. As mentioned above, the video signals consist of the two fields of alternating polarity separated by inactive intervals and offset by a DC level. This signal is passed through a buffer amplifier 210 and applied to a first adder circuit 212. The adder 212 has three inputs: the video signal, an individual pixel offset signal from a first digital-to-analog converter (DAC) 220, and a feedback signal from a first integrator circuit 230.

In accordance with the present teachings, in a calibration mode, a uniform cold reference pattern is used to illuminate the array while the outputs are scanned into the field memory 308 of a digital logic section 300. In the preferred embodiment, the inventive digital logic section 300 is implemented with a field programmable gate array with firmware stored in a programmable read-only memory (PROM). However, those skilled in the art will appreciate that the circuit 100 may be implemented in software in a microprocessor or implemented in hard-wired logic circuits without departing from the scope of the present invention. The output of each detector should be zero. As discussed more fully below, the nonzero detector outputs are stored in a detector coarse DC offset correction memory 302 in the digital logic circuit 300. These signals are used for offset correction of instantaneous signals output by each detector via a DAC 220 and an adder 212.

Figure 11:
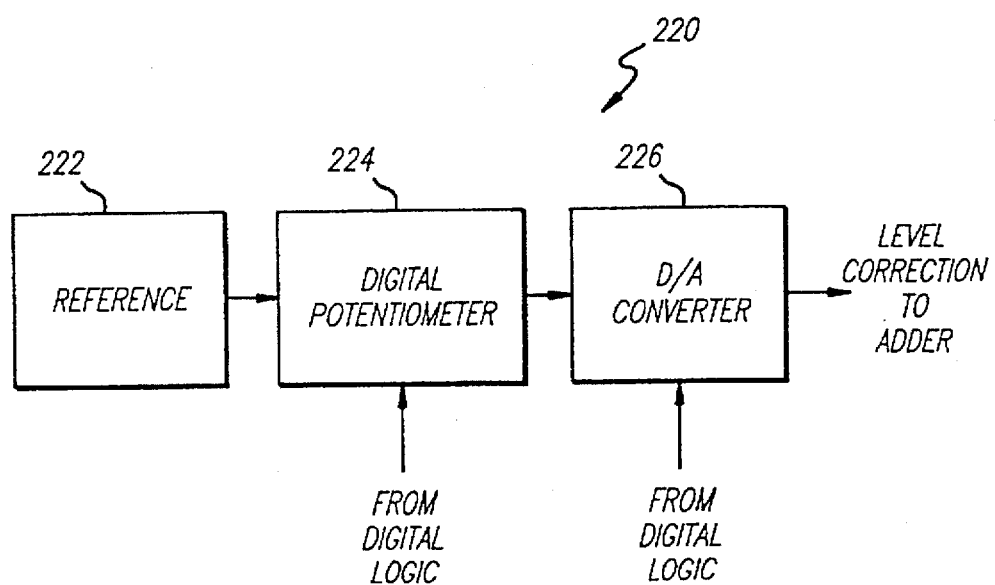
FIG. 11 is a block diagram of an illustrative implementation a first digital-to-analog converter utilized in the night vision system of the present invention.

FIG. 11 is a block diagram of an illustrative implementation of the DAC 220. A source of reference potential 222 provides a reference signal to a digital potentiometer 224. Since the range of offset correction required varies from detector to detector, the range of the digital-to-analog converter 226 is matched to each detector by the digital potentiometer 224, whereupon, the digital-to-analog converter 226 converts the stored offset signals to an analog output signal for input to the adder 212.

The integrator 230 averages two successive fields and drives the sum to zero to eliminate the average offsets. The first integrator 230 cancels the DC offset of the input signal and performs a function similar to AC coupling with a long time constant. That is, the average value of the active period is set to zero by integrating the video and feeding the result back into the first adder circuit 212.

Figure 12:
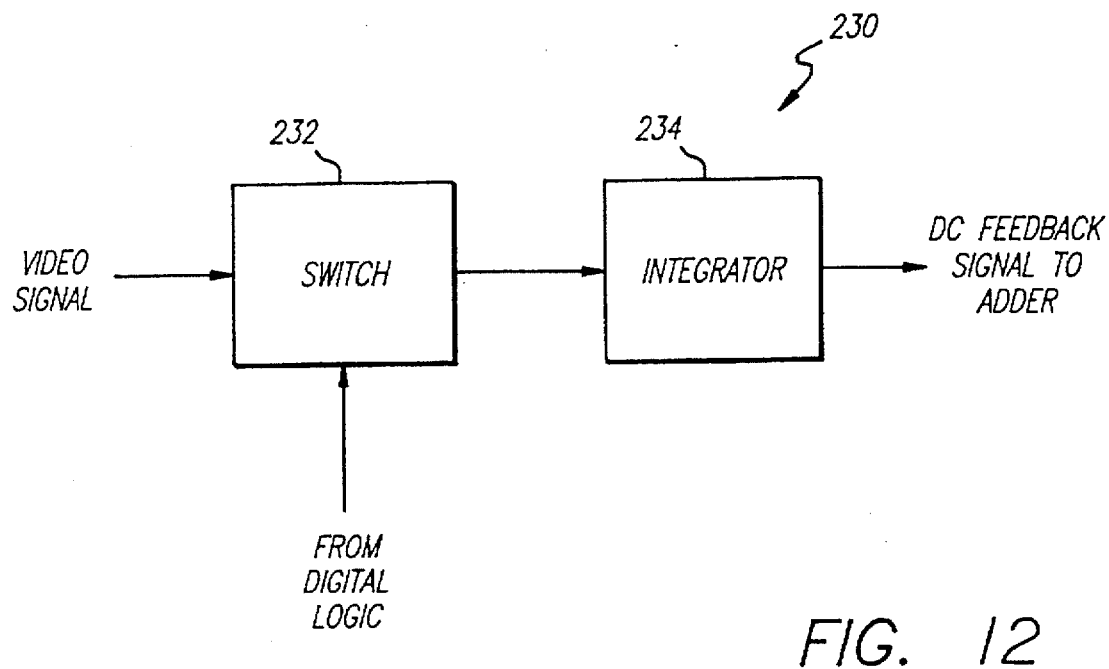
FIG. 12 is a block diagram of an illustrative implementation of a first integrator circuit utilized in the night vision system of the present invention.

FIG. 12 is a block diagram of an illustrative implementation of the first integrator circuit 230. The switch 232 receives a blanking signal from a timing circuit 320 (FIG. 10b). The RS 170 display controller timing circuit 320 provides timing for the system suitable for the RS 170 video format. The blanking signal serves to disable the integrator 234 during inactive periods in the video signal.

Returning to FIG. 10b, the output of the adder 212 is input to a unity gain inversion circuit or polarity switch 240 which operates under control of the RS 170 timing circuit 320. The polarity switch 240 is implemented with an analog multiplier/inverter. The input/output waveform of the polarity switch 240 is shown in FIGS. 12(a)–12(b). As discussed more fully below, a significant feature of the present invention derives from the inversion of alternating fields of the output of each detector by the unity gain inversion circuit 240. This facilitates field-to-field subtraction, which effectively cancels DC offset in each field while preserving the AC signal for subsequent processing.

FIG. 12(a) is a waveform illustrating the output of a typical pyroelectric detector. FIG. 12(b) is a waveform illustrating the waveform of FIG. 12(a) after field-to-field gain inversion in accordance with the present teachings. FIG. 12(c) illustrates a previous field of output from a pyroelectric detector. FIG. 12(d) is a waveform illustrating the output after a summation of the waveforms shown in FIGS. 12(b) and 12(c).

As mentioned above, the chopper 19 chops the scene at the field rate so that there is a detector output every field. See FIG. 12(a). The polarity switch 240 effects field-to-field gain inversion in such a way that for the even fields (n=0, 2, 4, 6, . . . ), the resulting output equals (1) times the detector output and for the odd fields (n=1, 3, 5, . . . ), the resulting output equals (−1) times the detector output. See FIG. 12(b). Then the inverted signal is digitized by the analog-to-digital converter 294. Alternating fields are stored in a field memory 308. Data from a previous field (field n−1) (FIG. 12(c)) is retrieved from the field memory 308 and summed with the current field (field n) to cancel the DC bias in each field (FIG. 12(d)). As shown in FIG. 12(d), after summing fields n−1 and n together in the adder 310, the detector DC bias is canceled, but the resulting detector scene signal is doubled.

A second step in the calibration process involves the illumination of the array 20 with a uniform warm reference pattern. The outputs of the detectors should be equal. The equal and nonequal outputs are digitized and stored in a gain correction memory 304 in the digital logic circuit 300 and used for sensitivity correction via a multiplier 250 and a second DAC circuit 260.

Figure 13:
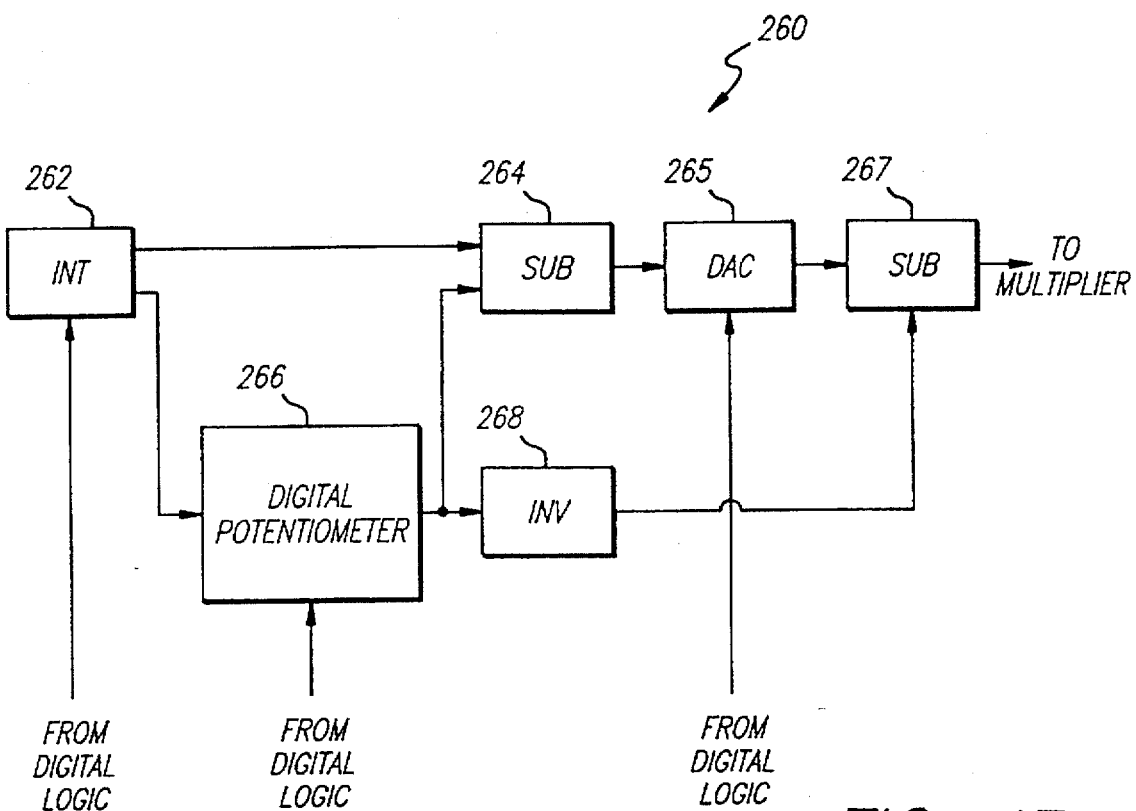
FIG. 13 is a block diagram of an illustrative implementation of a second digital-to-analog converter utilized in the night vision system of the present invention.

FIG. 13 is a block diagram of an illustrative implementation of the DAC circuit 260. The integrator 262 integrates pulses from the digital logic circuit 300 to create a voltage level proportional to the desired video gain. This controls the global gain applied to the detector with the weakest signal output. This gain factor is reduced to a minimum value for the detector with the strongest output in sensitivity calibration. The range of gain control is set by a digital potentiometer 266. The integrator 262 and the potentiometer 266 feed a subtractor circuit 264 which, in turn, provides an input signal to a multiplying D/A (digital-to-analog) converter 265 which sets intermediate levels. As the range of the D/A converter is reduced, a complementary DC level is added to the output by an inverter 268 and a subtractor 267 to keep the full scale output of the multiplier 250 constant.

Returning to FIG. 10b, in addition to a limiter 290, two feedback loops are used to control the dynamic range of the signal going into the A/D (analog-to-digital) converter 294. The output of the A/D converter is fed to a field-to-field automatic global gain and level control section 306 in the digital logic circuit 300. The field-to-field automatic global gain and level control circuit 306 compares the digitized signal to upper and lower threshold values. If the digital value is above the upper threshold, a high level is output to an offset integrator 280. If the value is below the lower threshold, a low level is sent to the integrator 280. Levels between the thresholds tri-state the output to the integrator, resulting in no signal from the digital logic section 300. This output is also tri-stated during inactive video periods. The integrator 280 is referenced to a voltage midway between the two logic levels. The result is that equal numbers of pixels will fall above the upper threshold and below the lower threshold. This provides automatic global level control across the array 20.

Automatic gain control may be effected in accordance with any one of a number of schemes which are well-known in the art. In the preferred embodiment, automatic gain control is provided by generating a high level when the signal is outside the thresholds, a low level when it is within the thresholds, and tri-state when the video is inactive. This is fed to the integrator 262 of FIG. 13 and compared to a reference that is a fraction of the logic level (10% for example). The result is that most of the pixels (90%) will fall between the thresholds and a few pixels (10%) will be above or below the thresholds.

Thus, as depicted in FIG. 9, the digital signals from the analog input section 200 are processed by digital logic section 300 and stored in its frame memory. The digital output from the digital logic section 300 is converted to standard video format (typically RS 170) by an analog output section 400.

Figure 14:
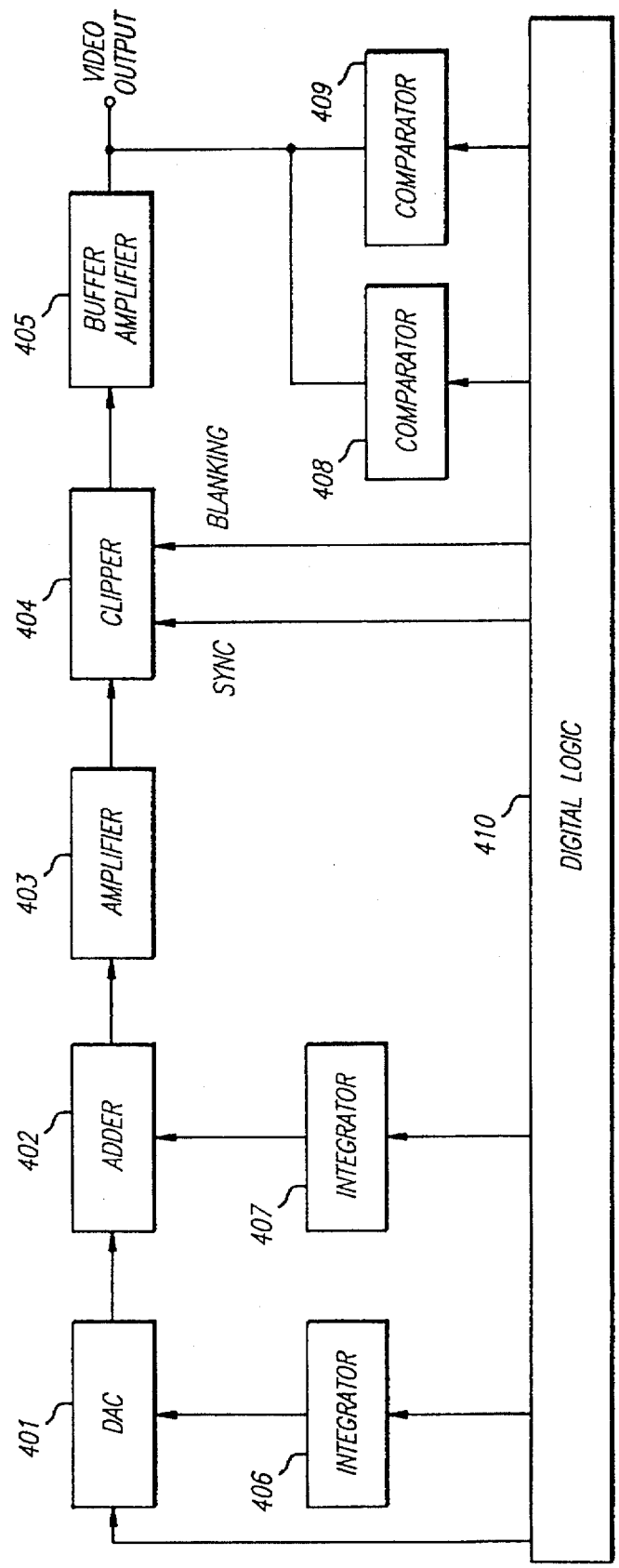
FIG. 14 is a block diagram of an illustrative implementation of the analog output section of the signal processing system of the present invention.

FIG. 14 is a block diagram of an illustrative implementation of the analog output section 400. The video signal comes from the digital logic section 300 as successive pixel values. These digital signals are converted to analog form by a DAC 401. The scale factor of these signals is varied by using the output of an integrator 406 as the reference voltage for the DAC 401. A second integrator 407 is used to supply an offset voltage which is added to the DAC output in an adder stage 402. The output of the adder is then amplified in an amplifier stage 403 to the final output level desired. The video signal is then combined with sync and blanking pulses from the digital logic using a clipper circuit 404. The clipper circuit 404 is arranged such that the most negative signal passes to its output. The sync signal is adjusted such that its negative excursion is below the blanking and video signals and its positive excursion is above the video signal range.

The blanking signal is adjusted such that its negative level is below the video range but above the negative sync level and its positive level is above the video signal range. When the sync signal is negative, the output is at the sync level regardless of the blanking and video signal levels. When the sync signal is positive and the blanking level is negative, the output is at the blanking level regardless of the video level. When both the sync and blanking signals are positive, the output follows the video signal. A buffer amplifier 405 provides the output current necessary to drive the load (typically 75 ohms) placed on the circuit. Feedback may be applied around the amplifier clipper and buffer stages to control their overall gain.

The comparators 408 and 409 are used to detect when the output exceeds the middle of video range (408) or falls outside two thresholds set near the limits of the video range 409.

The automatic level control operates by using the digital logic to gate the output of the midpoint comparator 408 with the blanking pulse. The output of the digital logic is open circuited (tri-state) during the blanking periods. It is low when the video is below the midpoint value and high if the video is above the midpoint value. This signal is integrated by an integrator 407 which is referenced to a voltage midway between the high and low logic levels. The output of the integrator controls the offset added to the video signal. An equilibrium condition is established where half of the pixels are above midscale and half below.

The other comparator 408 is a window comparator with limits set near the limits of the video range (typically at 10% and 90% of the video range). The automatic gain control operates by using digital logic to gate the window comparator with the blanking pulse. The output of the digital logic is open circuited (tri-state) during the blanking periods. It is low when the video signal is within the window and high when the video signal is outside the window. This signal is integrated by an integrator 406 which is referenced to a voltage that is a fraction of the digital logic voltage (typically 5%). The output of the integrator varies the reference voltage of the DAC 401. This forms a feedback loop that reaches an equilibrium condition when 95% of the pixels fall between the 10% and 90% levels of the video range.

While the signal processor 100 may be implemented in a manner well within the ability of one of ordinary skill in the art, in the preferred embodiment, the processor disclosed and claimed in U.S. patent application Ser. No. 08/226,796, filed Apr. 12, 1994 by D. Masarik et al. and U.S. patent application Ser. No. 08/226,588, filed Apr. 12, 1994 by D. Masarik et al., the teachings of which are incorporated herein by reference, would be used for the illustrative application.

Figure 15:
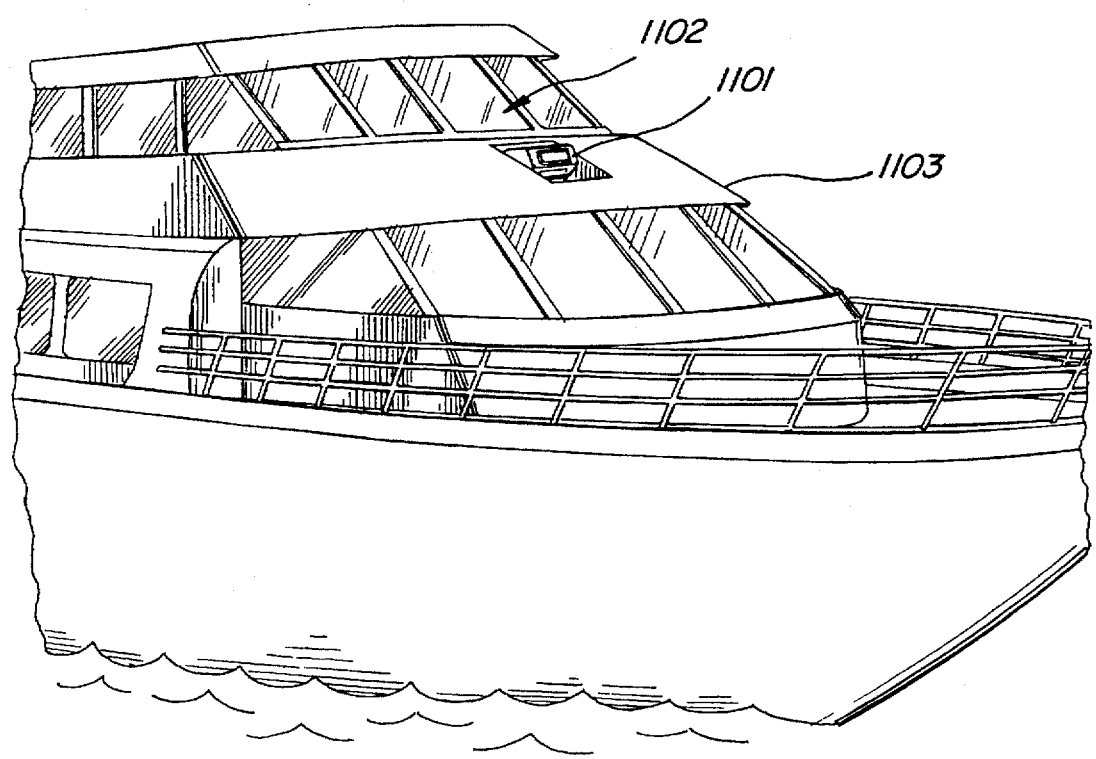
FIG. 15 is a partial perspective view of a night vision system according to the invention installed on a marine vessel.

FIG. 15 illustrates installation of a night vision camera 1101 according to the invention mounted below the bridge of a marine vessel 1103. Such cameras 1101 may be mounted in one or more locations, such as the bow, stern, or mast of the marine vessel to provide navigators, crew, or operators enhanced vision during periods of low light or poor visibility. Although the camera 1101 would be subjected to destructive weather conditions such as gale-force winds and crashing waves, its low cost makes it feasible to mount in such locations. In contrast, it would not be feasible to mount a $50,000 camera on the bow, stern or mast of a marine vessel.

The infrared camera 1101 and cooperating system componentry are constructed as illustrated above in connection with FIGS. 1–14. The system componentry again includes an infrared camera, mounting hardware, video and power cables, video display monitor (or heads-up display) and control box (remote control).

Figure 16:
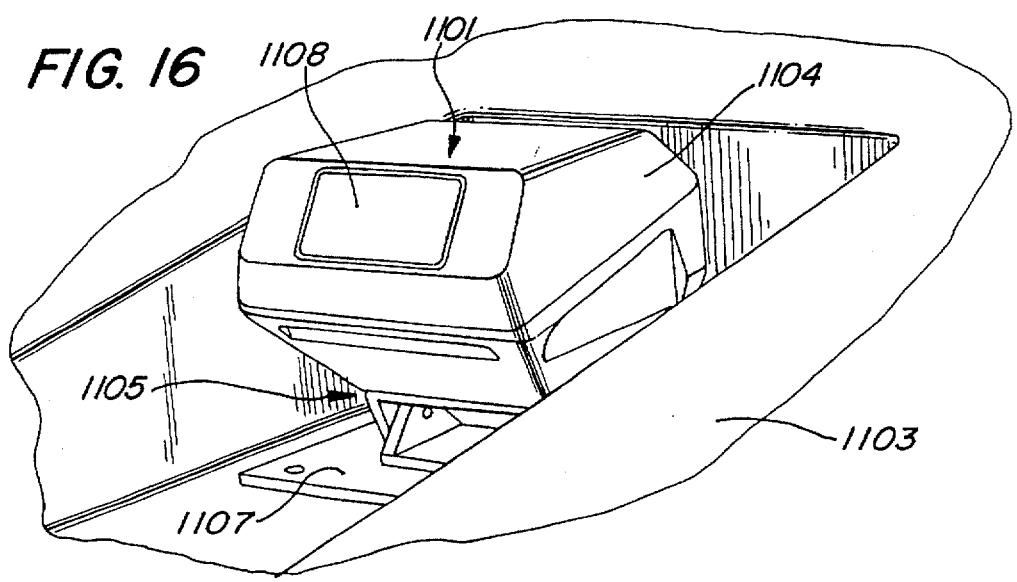
FIG. 16 is an enlarged view of a portion of FIG. 15 more particularly illustrating night vision apparatus according to the invention.

As shown in FIG. 16, a more cosmetically streamlined camera housing 1104 may be employed. As with camera 1, the camera 1104 is used to detect small differences in temperature, or infrared radiation, from objects in a scene to produce clearly visible images in a black-and-white TV-like format. The camera 1104 again preferably uses uncooled detectors, high-speed, precision reflective optics, and signal processing electronics housed in a compact, water-resistant case.

The camera 1104 is optionally mounted by a positioning mechanism 1105 providing tilting and panning mechanisms substantially identical to those disclosed above mounted to a somewhat modified rectangular mounting base 1107. This mount 1105 allows the infrared camera(s) to be panned or tilted to provide full coverage of the surrounding scene.

The video display monitor of the system is preferably mounted inside the bridge 1102 of the vessel 1103 on a swivel mount in clear view of the navigator, crew, or other operators; typically in the vessel cockpit or wheelhouse. The display may be an active matrix liquid crystal display which is capable of brightness and contrast adjustments. The display may be capable of displaying color television images to provide a natural view of the scene, as well as radar information. A baffle is preferably used to minimize stray light reflected from the display. Red, amber, purple, and blue-green filters may be used to help an observer view the display during the night without reducing the observer's night accommodation or visual acuity.

As with the embodiment of FIG. 1, a video coax cable connects the camera 1101 to the video bridge mounted display monitor. Separate power cables again provide power to the camera 1101 and display. The remote control unit is mounted near the display and hard wired between the display and the camera 1101. The remote control provides the pan/tilt mechanism and toggles the video to show hot objects as either a "white" or "black" color on the display, all as previously disclosed in connection with the law enforcement emergency vehicle embodiment.

With respect to marine applications, the subject invention is particularly useful in nighttime man-overboard situations, where it greatly improves the chances of spotting and recovering the man overboard. It is also helpful in detecting various nighttime marine hazards including tow lines connecting a tow boat and a barge, lobster traps, large containers which have fallen off commercial ships (and tend to float just above the surfaces), and floating debris left after or during major holidays. The invention further provides nighttime navigation assistance in a number of contexts including navigating in unfamiliar harbors, navigating in shallow water, navigating in heavy traffic, increasing nighttime navigational reaction time, spotting other boats such as Coast Guard and smugglers running without lights, and spotting waves breaking on reefs, thereby identifying shallow water.

For both the public safety vehicle and the marine vessel an optional window wiper mechanism can be used to remove excess moisture from the infrared transmissive window of the camera. Such a window wiper mechanism is disclosed in U.S. application Ser. No. 08/263,272, filed Jun. 21, 1994, by David Kline et al. and entitled WINDOW WIPER SYSTEM FOR INFRARED CAMERAS, herein incorporated by reference.

Thus, the present invention has been described herein with reference to a particular embodiment for a particular application. Those having ordinary skill in the art and access to the present teachings will recognize additional modifications, applications, and embodiments within the scope thereof.

It is therefore intended by the appended claims to cover any and all such applications, modifications and embodiments within the scope of the present invention.

What is claimed is:

1. A night vision system for a surface vehicle comprising:
   an infrared camera mounted on the surface vehicle, said infrared camera comprising:
   a first housing having an aperture;
   a window disposed on the first housing at the aperture, the window being transmissive to infrared energy;

an array of detectors disposed within the first housing, each detector providing an electrical output signal when illuminated with infrared energy;

reflective optical means for focusing infrared radiation onto said array;

a chopper disposed between the reflective optical means and the array; and signal processing means for providing electrical output signals from the array;

pointing means for adjusting a pointing angle of the camera, said pointing means comprising:

a tilt gimbal adaptable to support the camera and allow the camera to rotate about a first axis of rotation that extends through the center of gravity of the camera;

a pan gimbal supporting the tilt gimbal and rotating about a second axis of rotation;

a second housing for supporting the pan gimbal and the tilt gimbal, the second housing being mountable to the surface vehicle;

means, responsive to a first control signal, for rotating the pan gimbal;

means, responsive to a second control signal, for rotating the tilt gimbal;

means for generating the first and second control signals, wherein the means for rotating the pan gimbal includes a pan gear attached to the pan gimbal, a longitudinal axis of the pan gear being coaxial with the second axis of rotation; and an electric motor and at least one gear for allowing the electric motor to drive the tilt gear, wherein the means for rotating the pan gimbal further includes means for sensing the position of the pan gimbal, the sensing means including a magnetized portion on the pan gear and at least one magnetic sensor proximate the pan gear, and wherein the means for rotating the pan gimbal further includes a circuit board mounted proximate the pan gear and a circuit for driving the motor, the circuit and the at least one magnetic sensor being mounted on the board;

control means for providing position control signals to said pointing means, said pointing means adjusting said pointing angle in response to said control signals; and display means for displaying the electrical output signals from said array in the camera.

2. The invention of claim 1 wherein the detectors are pyroelectric detectors.

3. The invention of claim 1 wherein the detectors are silicon microbolometer detectors.

4. The invention of claim 1 wherein said optical means are fabricated substantially from plastic.

5. The invention of claim 1 wherein the optical means includes a wide angle field of view.

6. The invention of claim 1 wherein the optical means includes a narrow angle field of view.

7. The invention of claim 1 wherein said optical means includes a WALRUS design for focusing infrared radiation onto said array.

8. The invention of claim 1 wherein the control means is a remote control system.

9. The invention of claim 8 wherein the remote control system includes a joystick for providing azimuth and elevation position control signals to the pointing means.

10. The invention of claim 1 wherein the display means includes a head-up display.

11. The invention of claim 1 wherein the display means includes a virtual image display.

12. The invention of claim 1 wherein the display means includes a flat panel display.

13. The invention of claim 1 wherein the display means is located within a driver's compartment of said vehicle.

14. The invention of claim 1 wherein said surface vehicle is a marine vessel having a bridge, and wherein said camera is mounted below and outside the bridge of said marine vessel.

15. The invention of claim 1 wherein said surface vehicle is a land vehicle having a roof, and wherein said camera is mounted to said roof of said vehicle.

16. The invention of claim 15 wherein said camera is mounted to said roof of said vehicle by an elongated center support.

17. The invention of claim 16 wherein said land vehicle is a police car having a light bar, and wherein said elongated center support is adjacent said light bar, said camera being able to see over said light bar.

18. The invention of claim 1 wherein said reflective optical means includes a reflective triplet for focusing the infrared radiation onto said detectors.

19. The system of claim 1, wherein the detectors are sensitive to radiation having wavelengths substantially in the 3-5 micron range.

20. The invention of claim 1 wherein said array of detectors comprises uncooled detectors.

21. A night vision system suitable for mounting on an aquatic vessel, the night vision system comprising:

an infrared camera mounted on the aquatic vessel, the infrared camera providing electrical output signals;

pointing means for adjusting a pointing angle of the camera, said pointing means comprising:

a tilt gimbal adaptable to support the night vision system and allow the night vision system to rotate about a first axis of rotation that extends through the center of gravity of the night vision system;

a pan gimbal supporting the tilt gimbal and rotating about a second axis of rotation;

a housing for supporting the pan gimbal and the tilt gimbal, the housing being mountable to the vessel;

means, responsive to a first control signal, for rotating the pan gimbal;

means, responsive to a second control signal, for rotating the tilt gimbal; and means for generating the first and second control signals, wherein the means for rotating the pan gimbal includes a pan gear attached to the pan gimbal, a longitudinal axis of pan gear being coaxial with the second axis of rotation; and an electric motor and at least one gear for allowing the electric motor to drive the tilt gear, wherein the means for rotating the pan gimbal further includes means for sensing the position of the pan gimbal, the sensing means including a magnetized portion on the pan gear and at least one magnetic sensor proximate the pan gear, and wherein the means for rotating the pan gimbal further includes a circuit board mounted proximate the pan gear and a circuit for driving the motor, the circuit and the at least one magnetic sensor being mounted on the board;

control means for providing position control signals to said pointing means, said pointing means adjusting said pointing angle in response to said control signals;

signal processing means for processing the electrical output signals of the infrared camera; and display means for displaying the electrical output signals from the signal processing means.

22. The invention of claim 21 wherein the camera includes an array of uncooled detectors.

23. The invention of claim 22 wherein the detectors are pyroelectric detectors.

24. The invention of claim 22 wherein the detectors are silicon microbolometer detectors.

25. A night vision system for a surface vehicle comprising:

an infrared camera mounted on the surface vehicle, said infrared camera comprising:

an array of uncooled detectors which provides an electrical output signal when illuminated with infrared energy;

a reflective optical arrangement for focusing energy onto the array, said reflective optical arrangement having a wide angle field of view and a noncircular aperture, the reflective optical arrangement comprising:

a primary mirror for reflecting energy from said aperture, the primary mirror having higher order aspheric contour and a negative power;

a secondary mirror for reflecting energy from the primary mirror, the secondary mirror having a higher order aspheric surface and a positive power;

a fold mirror for reflecting energy from the secondary mirror; and a tertiary mirror for focusing and redirecting energy from the fold mirror to the detectors, the tertiary mirror having positive power; and a chopper disposed between the reflective optical arrangement and the array, the chopper providing a reference level for the array;

pointing means for adjusting a pointing angle of the camera, said pointing means comprising:

a tilt gimbal adaptable to support the night vision system and allow the night vision system to rotate about a first axis of rotation that extends through the center of gravity of the night vision system;

a pan gimbal supporting the tilt gimbal and rotating about a second axis of rotation;

a housing for supporting the pan gimbal and the tilt gimbal, the housing being mountable to the top of the surface vehicle;

means, responsive to a first control signal, for rotating the pan gimbal;

means, responsive to a second control signal, for rotating the tilt gimbal; and means for generating the first and second control signals, wherein the means for rotating the pan gimbal includes a pan gear attached to the pan gimbal, a longitudinal axis of pan gear being coaxial with the second axis of rotation; and an electric motor and at least one gear for allowing the electric motor to drive the tilt gear, wherein the means for rotating the pan gimbal further includes means for sensing the position of the pan gimbal, the sensing means including a magnetized portion on the pan gear and at least one magnetic sensor proximate the pan gear, and wherein the means for rotating the pan gimbal further includes a circuit board mounted proximate the pan gear and a circuit for driving the motor, the circuit and the at least one magnetic sensor being mounted on the board;

control means for providing position control signals to said pointing means, said pointing means adjusting said pointing angle in response to said control signals; and display means for displaying the electrical output signals from said array in the camera.

26. The invention of claim 25 wherein the detectors are pyroelectric detectors.

27. The invention of claim 25 wherein the detectors are silicon microbolometer detectors.

* * * * *